Inventor:
Anton Ashmele
by Michael S. Striker
Attorney

Nov. 1, 1966 A. ASHMELE 3,282,588

SOUND REPRODUCING APPARATUS

Filed July 26, 1963 11 Sheets-Sheet 2

Inventor:
Anton Ashmele
by Michael S. Striker
Attorney

Inventor:
Anton Ashmele
by Michael S. Striker
Attorney

Nov. 1, 1966 A. ASHMELE 3,282,588

SOUND REPRODUCING APPARATUS

Filed July 26, 1963 11 Sheets-Sheet 4

Inventor:
Anton Ashmele
By Michael S. Striker
Attorney

Inventor:
Anton Ashmele
by Michael S. Striker
Attorney

Inventor:
Anton Ashmele
by Michael S. Striker
Attorney

Nov. 1, 1966 A. ASHMELE 3,282,588

SOUND REPRODUCING APPARATUS

Filed July 26, 1963 11 Sheets-Sheet 7

Inventor:

Anton Ashmele

By Michael S. Striker

Attorney

Inventor:
Anton Ashmele
by Michael S. Striker
Attorney

Nov. 1, 1966

A. ASHMELE 3,282,588

SOUND REPRODUCING APPARATUS

Filed July 26, 1963

11 Sheets-Sheet 9

Inventor:
Anton Ashmele

By Michael S. Striker
Attorney

Nov. 1, 1966 A. ASHMELE 3,282,588

SOUND REPRODUCING APPARATUS

Filed July 26, 1963 11 Sheets-Sheet 10

INVENTOR

Anton Ashmele

BY Michael S. Striker

ATTORNEY

Nov. 1, 1966 A. ASHMELE 3,282,588

SOUND REPRODUCING APPARATUS

Filed July 26, 1963 11 Sheets-Sheet 11

INVENTOR

Anton Ashmele

BY Michael S. Striker

ATTORNEY

United States Patent Office 3,282,588

Patented Nov. 1, 1966

3,282,588

SOUND REPRODUCING APPARATUS

Anton Ashmele, 10 Belchenstrasse, Trossingen, Wurttemberg, Germany

Filed July 26, 1963, Ser. No. 297,798
Claims priority, application Germany, Aug. 3, 1962, T 15,006; Oct. 19, 1962, T 22,890
13 Claims. (Cl. 274—1)

The present invention relates to sound reproducing apparatus in general, and more particularly to a sound reproducing apparatus of the type wherein a rotary disk-shaped record carrier is driven by a motor including a spring which can be rewound or retensioned by a flexible element, such as a cord, a length of wire, a string or the like. Still more particularly, the invention relates to improvements in the construction and mounting of the tone arm and of certain other elements in the sound reproducing mechanism of such apparatus.

It is an object of the invention to provide a sound reproducing apparatus of the type wherein the record carrier is provided with a series of independent sound grooves and wherein such independent sound grooves may be traced by the stylus in a predetermined sequence and/or in a sequence which may be selected by the operator.

Another object of the invention is to provide an improved stop mechanism which may be used in a sound reproducing apparatus of the just outlined characteristics and which may be adjusted, either automatically in response to retensioning or rewinding of the spring which drives the record carrier or by hand, to determine the starting position of the tone arm and to thereby select the sound groove which is to be traced by the stylus when the apparatus is put to actual use.

An additional object of the invention is to provide a sound reproducing apparatus in the form of a toy phonograph which is of very compact design, which is of lightweight construction, and which may be manufactured at a low cost so as to warrant the use of such apparatus in toy devices including talking dolls, musical toys and the like.

Still another object of the instant invention is to provide a sound reproducing apparatus of the type which utilizes a disk-shaped record carrier and which may be mounted in a toy or in another device with moving parts in such a way that the reproduction of sound is started in response to certain other movements which the device must or can carry out when it is put to use.

A concomitant object of the invention is to provide an improved tone arm for use in sound reproducing apparatus of the above outlined characteristics.

A further object of the invention is to provide sound reproducing apparatus which is sufficiently rugged to withstand careless handling by children and which, once its tone arm is properly adjusted, will reproduce the sound recorded on a disk-shaped carrier as often as desired with minimal wear on the record carrier and with a clarity which is surprising in view of the simplicity of its sound reproducing mechanism.

An additional object of the invention is to provide a sound reproducing apparatus wherein the accuracy in alignment of the stylus with a selected sound groove (if the record carrier is formed with several sound grooves) or with a single sound groove is not affected and cannot be changed by the flexible element which is used to store energy in the spring for the record carrier.

A further important object of the present invention is to provide a toy phonograph which is constructed and assembled in such a way that it need not be provided with a separate housing and which may be built into a talking doll or another toy device so that the toy device actually constitutes the sole housing therefor.

Another object of my invention is to provide a toy phonograph of the just outlined characteristics which may be readily removed from the toy device and whose loudspeaker may be mounted in such zones of the toy device which are most likely to create the impression of a sound producing living creature or of a full-sized machine when the phonograph is put to actual use.

An additional object of the invention is to provide an improved toy device whose torso, head or another body portion may constitute the sole housing of one or more toy phonographs.

A concomitant object of the invention is to provide a sound producing toy device whose dimensions need not be increased or whose dimensions are increased only negligibly in view of the fact that the toy device accommodates one or more toy phonographs of the above outlined characteristics.

A further object of the invention is to provide a toy device which is capable of emitting sound in two or more directions and which is assembled in such a way that the rewinding element or elements for one or more toy phonographs are normally concealed so that they cannot detract from the true-to-life effect of the toy device when the latter is used with or without sound.

With the above objects in view, one feature of my invention resides in the provision of a sound reproducing apparatus which comprises a housing and a phonograph mechanism accommodated in the housing. The phonograph mechanism comprises a rotary disk, a rewindable spring for rotating the disk, means for winding the spring including a flexible element which is stretched when the spring is held against unwinding and which is slack when the spring unwinds to rotate the disk, a stylus overlapping the disk and movable between a starting position at a first distance and a second position at a second distance from the periphery of the disk, deformable retainer means normally biasing the stylus into engagement with the disk so that, when the spring unwinds to rotate the disk, the stylus is compelled to travel from its starting position to its second position, deforming means responsive to stretching of the flexible element for deforming the retainer means so that the stylus may be disengaged from the disk, and means for automatically returning the stylus to its starting position when the stylus is disengaged from the disk.

In accordance with another feature of my invention, the housing may constitute a hollow body portion of a toy device so that the phonograph mechanism is without a separate housing. The flexible element extends from the housing and may be grasped by hand to rewind the spring.

The novel features which are considered as characteristic of the invention are set forth in particular in the appended claims. The apparatus itself, however, both as to its construction and its mode of operation, together with additional features and advantages thereof, will be best understood upon perusal of the following detailed description of certain specific embodiments with reference to the accompanying drawings, in which:

Figure 2:
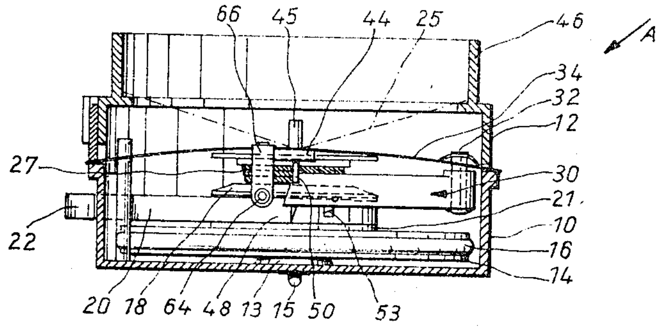
FIG. 2 is a transverse section as seen in the direction of arrows from the line 2—2 of FIG. 1.

Referring now in greater detail to the illustrated embodiments, and first to FIGS. 1 to 3, there is shown a sound reproducing apparatus A, hereinafter called phonograph or toy phonograph, which comprises a metallic housing or casing including a first section or base 10 and a second section or cover 12. This housing defines an internal chamber 11 which accommodates the sound reproducing mechanism and the record carrier here shown as a disk 28, the latter being mounted on or being integral with a turntable 14 whose shaft 15 is rotatable in a bearing 13 forming part of or secured to the inner side of the base 10. The periphery of the turntable 14 is provided with a groove for an endless belt 16 which forms part of a speed regulator and which drives a centrifugal governor whose shaft 17 is shown in the upper part of FIG. 1. The housing 10–12 comprises lugs 19 by means of which the phonograph may be detachably or permanently mounted in the torso, head or another body portion of a toy device, such as a talking doll, a musical toy with moving parts or the like, not shown. Of course, the phonograph is equally useful in toy trains, ships, cranes, aircraft and other types of toy devices which are smaller-scale replicas of various machines or other structures.

Figure 3:
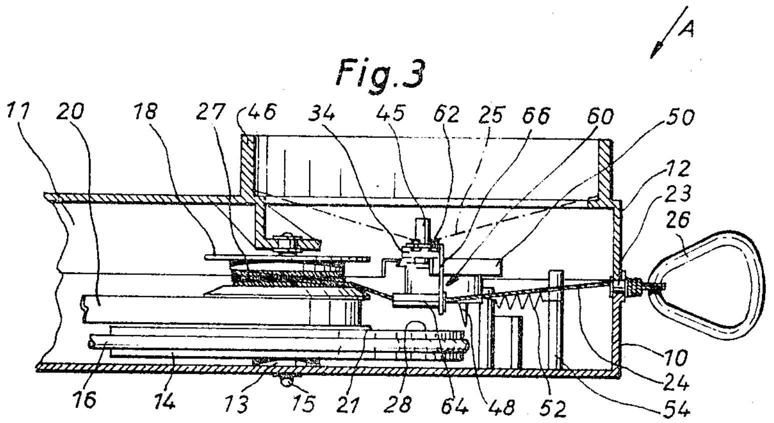
FIG. 3 is a fragmentary longitudinal section as seen in the direction of arrows from the line 3—3 of FIG. 1.

The upper side of the turntable 14, as viewed in FIG. 2 or 3, is adjacent to a concentric drum 21 whose central portion (not shown) is connected with the shaft 15 and with one end portion of a rewindable torsion spring 20. The other end portion 22 of this spring is anchored in the base 10, preferably in such a way that it may be readily separated from the housing in a manner best shown in FIG. 1. The spring 20 forms part of a motor for the turntable 14 and stores energy when it is convoluted around the axis of the drum 21 by a winding mechanism including a reel 18 which is concentrically fixed to the drum and whose core is connected with one end of a flexible element, such as a cord or string 24, this cord extending through a sleeve 23 which is mounted in the housing 10–12 and having its outer end connected to a handgrip means here shown as an eye 26. The arrangement is such that the spring 20 is tensioned in a fully automatic way in response to a pull exerted on the cord 24 in a sense to rotate the winding reel 18 in an anticlockwise direction, as viewed in FIG. 1. The connection between the shaft 15 and the turntable 14 comprises a free-wheel or one-way clutch 29 which enables the shaft 15 to rotate with the drum 21 and with the reel 18 without driving the turntable when the user tensions the spring 20 but which compels the turntable to rotate when the drum is driven by the unwinding spring which latter thus dissipates energy that is being stored during winding. As the spring 20 unwinds, it causes the reel 18 to take up the cord 24 so that the latter is nearly fully convoluted at the time the reproduction of the sound is completed. The convolutions of the cord 24 on the core of the winding reel 18 are indicated by the reference numeral 27.

The sound groove which is provided in the exposed side of the disk 28 is traced by a stylus or needle 48 secured to the inner end or head of a stylus carrier 30 which, for convenience, will hereinafter be referred to as a tone arm. This tone arm has an outer end which is turnable about a pivot means or stud 32 mounted in the chamber 11 at a point laterally of the turntable 14. As shown in FIG. 1, the head of the tone arm 30 may travel about the axis of the stud 32 so that the tone arm is adapted to assume a number of positions intermediate a first end position or starting position which is shown in full lines and a second position 30' which is indicated in phantom lines, whereby the stylus 48 travels from an outer convolution to an inner convolution of the sound groove in the disk 28, i.e., from a point nearer to toward a point more distant from the periphery of the disk. The length of the tone arm 30 approximates the length of the radius of the disk 28, and the head of this tone arm is normally biased toward the sound groove by a resilient retainer 34 which supports the stud 32 and whose apertured terminal portions 36, 38 are respectively carried by projections 40, 42 of the base 10, preferably in such a way that one of such terminal portions (i.e., the portion 36) is movable laterally with respect to the cooperating projection (40) thus allowing for some flexing of the retainer 34 in a sense that its median portion may move substantially axially of toward and away from the disk 28. The retainer 34 preferably consists of spring steel or an equivalent resilient material, and its median portion is provided with a contact element 44 which carries a supporting bolt 45, this bolt extending from the retainer 34 in a direction away from the disk 28, i.e., upwardly as viewed in FIGS. 2 and 3. The bolt 45 supports a loudspeaker 25 (shown in phantom lines) which is accommodated in a horn 46 forming part of the cover 12. The head of the tone arm 30 carries a signal transmitting bar 50 which engages with the contact element 44 whenever the stylus 48 traces the sound groove in the exposed side of the disk 28. The length of the bar 50 is sufficient to insure that it remains in engagement with the contact element 44 while the tone arm travels from the full-line to the phantom-line position of FIG. 1. The axis of the stud 32 is substantially parallel with the axis of the disk 28.

The phonograph further comprises a comparatively weak return spring 52 whose ends are respectively connected with a pin 53 provided on the tone arm 30 and with a second pin 54 which is permanently or adjustably secured to the base 10. The pin 53 is located at the underside of the tone arm, i.e., at that side which faces the sound groove in the disk 28. The arrangement is such that the spring 52 is free to return the tone arm 30 to the full-line starting position of FIG. 1 when the stylus 48 has reached the innermost convolution of the groove in the disk 28, that is, when the cord 24 is tensioned and is thereby stretched by the torsion spring 20 which latter tends to rotate the reel 18 also at the time when the eye 26 prevents further retraction of the cord into the chamber 11. The non-convoluted portion of the cord 24 is rather slack until the eye 26 strikes against the sleeve 23, and this non-convoluted portion is tensioned and is thereby stretched in a fully automatic way as soon as the eye 26 prevents it from following the bias of the spring 20. Such tensioning and resultant stretching of the non-convoluted portion of the cord 24 is utilized for automatically moving the stylus 48 substantially axially of and away from the disk 28, whereupon the spring 52 is free to return the tone arm 30 to the starting position of FIG. 1.

The deflecting or deforming device which compels the retainer 34 to lift or to move the tone arm 30 away from the disk 28 in the axial direction of the turntable 14 is identified by the reference numeral 60. This deforming device comprises an L-shaped bracket 66 which is riveted (as at 62) to the median portion of the retainer 34 and which carries at its free end a tubular guide 64 through which the non-convoluted portion of the cord 24 extends. The through bore of the guide 64 is positioned in such a way that it is not located in a straight line which connects the convolutions 27 on the reel 18 with the sleeve 23. In other words, the shortest axial distance between the disk 28 and the tubular guide 64 is less than the shortest axial distance between the disk and the convolutions 27 of the cord 24 on the reel 18 or the shortest axial distance between the disk and the sleeve 23 so that the non-convoluted portion of the cord automatically deforms the retainer 34 in a sense to move the stylus 48 away from the disk as soon as it is stretched by the spring 20. Tensioning and resulant stretching of the non-convoluted portion of the cord 24 takes place when the stylus 48 reaches the innermost convolution of the sound groove in the disk 28, and the cord remains under stretch not only when the phonograph A is idle but also while the user grasps the eye 26 and exerts a pull upon the cord in a direction to store energy in the spring 20. That end of the return spring 52 which is fixed to the pin 54 is located at a level above the level of the pin 53, as viewed in FIG. 3, whereby the head of the tone arm 30 actually moves laterally of and axially away from the grooved side of the disk 28 when it is permitted to follow the bias of the spring 52 and returns to its starting position in which it abuts against a preferably adjustable arresting device or stop 68.

The mounting of the resilient retainer 34 is such that its median portion normally tends to maintain the head of the tone arm 30 in operative position in which the stylus 48 engages the disk 28. However, the bias of the retainer 34 is insufficient to prevent the cord 24 from lifting the head of the tone arm 30 away from the disk when the non-convoluted portion of the cord is tensioned and is thereby stretched by the spring 20 or when the cord is tensioned and stretched by the user at the time the spring 20 is being rewound.

The phonograph A of FIGS. 1 to 3, operates in the following manner:

It is assumed that the non-convoluted portion of the cord 24 is stretched by the spring 20 because the eye 26 abuts against the sleeve 23. The tension of the thus stretched cord 24 is sufficient to deform the retainer 34 which then assumes the position of FIG. 3 and lifts the stud 32 with the tone arm 30 to thereby hold the stylus 48 at a distance from the grooved side of the disk 28. The spring 52 has returned the head of the tone arm into abutment with the stop 68 whereby the stylus 48 is located at a level above the outermost convolution of the sound groove.

If the user thereupon decides to play the disk 28, he merely grasps the eye 26 and pulls the cord 24 in order to wind the spring 20 to the extent permitted by the length of this spring. When the eye 26 is released, the spring 20 begins to unwind and drives the turntable 14 to rotate the disk 28. As soon as the spring 20 is free to unwind, the non-convoluted portion of the cord 24 slackens and the retainer 34 automatically returns to its non-deformed postion by simultaneously moving the stylus 48 into the outermost convolution of the sound groove. The vibrations of the stylus are transmitted to the diaphragm of the loudspeaker 25 which produces a series of sounds while the spring 20 continuously winds the cord 24 onto the reel 18. The length of the sound groove is preferably selected in such a way that the stylus 48 reaches the innermost convolution of this groove at the time the eye 26 comes into abutment with the sleeve 23 and arrests the turntable 14 by holding the spring 20 against further unwinding. The non-convoluted portion of the cord 24 is now under stretch and causes the tubular guide 64 to deform the retainer 34 in a manner to lift the tone arm 30 axially of and away from the disk 28, whereby the spring 52 is free to return the head of the tone arm to its starting position in which the stylus 48 is in registry with the outermost convolution of the sound groove. The phonograph is now at a standstill and is ready to replay the disk 28 if the user decides to pull the cord 24 in order to store energy in the spring 20.

An important advantage of the feature that the stud 32 is mounted directly on the retainer 34 is that the tone arm 30 and the retainer may be mounted in or removed from the housing as a unit as soon as the return spring 52 is detached from the pin 53 or 54. Furthermore, the tone arm is automatically compelled to move in axial direction of and away from the turntable 14 whenever the non-convoluted portion of the cord 24 is slack, i.e., whenever the retainer 34 is free to return to its normal undeformed position.

The modified phonograph B of FIGS. 4 to 9 comprises a plastic housing including a base 110 and a cover 112 which is rigidly secured to and which defines with the base an internal chamber 111. The central portion of this chamber accommodates a rotary turntable 118 whose coaxial trunnions 114, 116 are respectively received in bearings 120, 122. The bearing 120 forms part of the base 110; the other bearing 122 is integral with one end of an arm 113 which is rigid with the cover 112. The turntable 118 is driven by a motor including a rewindable torsion spring 124 having an inner end portion secured to the hub 126 of a winding reel 128 and an outer end portion 115 which is anchored in a side wall of the housing, see FIG. 5. The reel 128 is press-fitted onto a central extension 130 of the turntable 118, and this extension 130 carries the aforementioned trunnion 116.

In addition to the reel 128, the means for winding the spring 124 comprises a flexible element here shown as a cord 132 whose inner end is fixed to the core of the reel and whose non-convoluted portion extends through a guide sleeve 117 which is mounted in the housing 110–112. The outer end of the cord 132 is connected to an eye, not shown, in the same way as described in connection with FIGS. 1 to 3. When the user pulls the cord 132 with a view to wind the spring 124, the turntable 118 rotates in a direction counter to that when the phonograph B produces a series of audible signals. Such signals are produced by a stylus or needle 166 which cooperates with a specially constructed record carrier or disk 134, the latter being provided on and its outer diameter being substantially equal to the diameter of the turntable 118. The stylus 166 is mounted at one end of a tone arm 136.

Figure 4:
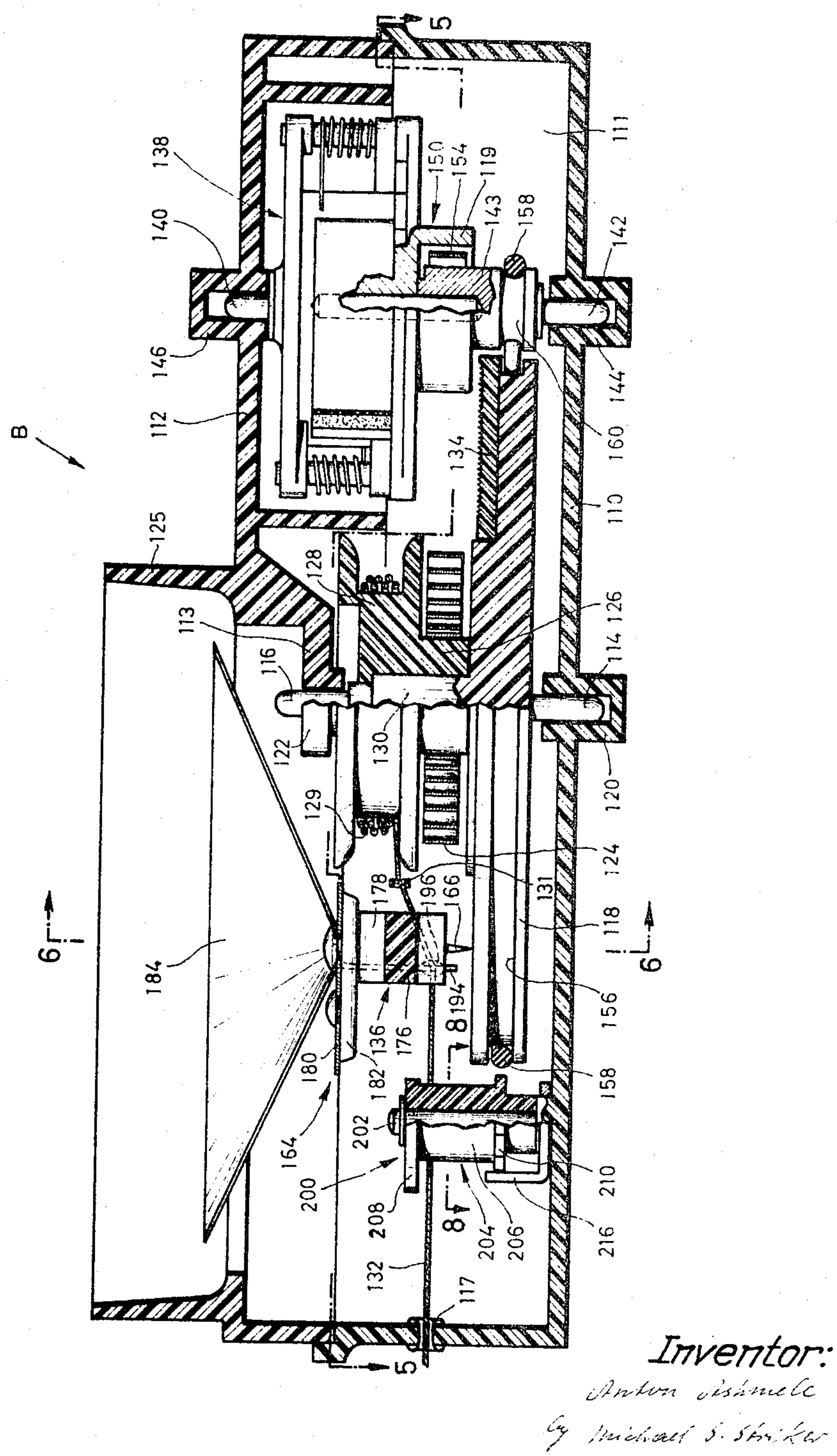
FIG. 4 is a central longitudinal section through a modified phonograph which is constructed in such a way that its stylus traces a different sound groove in response to each rewinding of the spring which drives the turntable for the record carrier, and wherein the stylus is automatically aligned with a new sound groove in response to actuation of the means which winds the spring.
Figure 5:
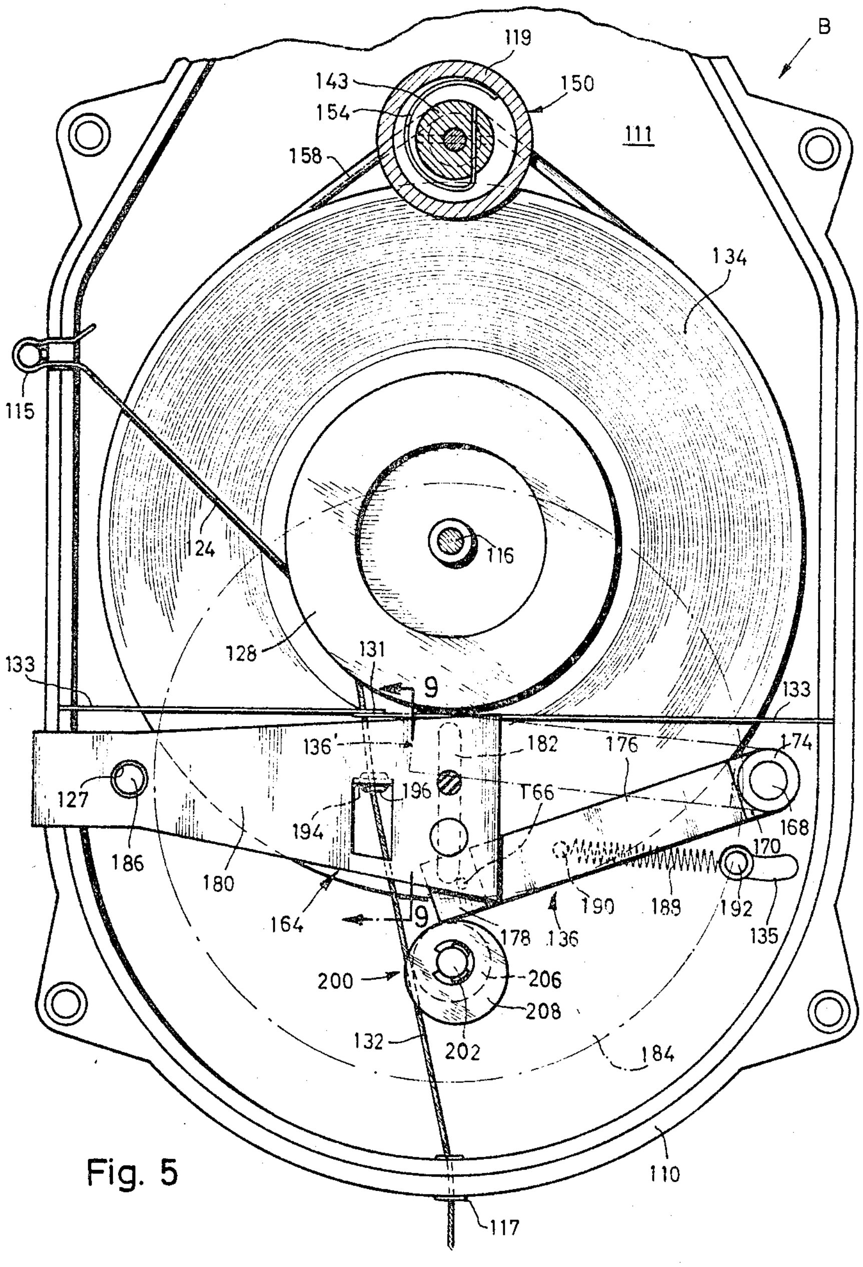
FIG. 5 is a fragmentary horizontal section as seen in the direction of arrows from the line 5—5 of FIG. 4.

The speed of the turntable 118 is controlled by a speed regulator 138 which is accommodated in the chamber 111, see particularly FIGS. 4 and 5, and whose coaxial trunnions 140, 142 are rotatable in bearings 146, 144 respectively provided in the cover 112 and base 110. The trunnions 140, 142 are disposed at the opposite ends of a shaft 143 whose axis is parallel with the common axis of the trunnions 114, 116. The centrifugal governor 150 of the speed regulator 138 is of known design and by itself forms no part of this invention. As shown in FIG. 4, and particularly in the upper part of FIG. 5, the governor 150 is driven by the shaft 143 through a free-wheel or one-way clutch here shown as a spring clutch including a torsion spring 154 whose inner end is anchored in the shaft 143 and whose outer end bears against the internal surface of a hollow cylindrical member 119 forming part of the governor 150. The spring 154 and the cylindrical member 119 constitute the cooperating elements of the clutch and compel the governor 150 to rotate when the shaft 143 is driven in a clockwise direction, as viewed in FIG. 5. The speed regulator 138 is driven by an endless belt 158 which is trained around the shaft 143 and around the turntable 118, there being circumferential grooves 156 (turntable 118) and 160 (shaft 143) to hold the belt 158 in requisite position.

The phonograph B further comprises a deformable retainer 164 which serves as a means for moving the stylus 166 axially toward and for permitting the stylus to move away from sound grooves in the exposed side of the disk 134. The disk 134 is formed with a series of independent sound grooves each of which includes an outer convolution close to the periphery of the disk and each of which is traced separately by the stylus 166, depending on the initial or starting position of the tone arm 136. These sound grooves resemble a series of coplanar spirals such as may be formed by a series of parallel needles which are disposed in a radial plane of the disk 134, by revolving the disk, and by simultaneously moving the needles toward the axis of the disk.

The retainer 164 cooperates with the aforementioned tone arm 136 whose outer end is provided with a boss 170, and this boss is rotatable on and is movable in the axial direction of a pivot means here shown as a stud or bolt 168 (see particularly FIGS. 6 and 7) which is rigid with the base 110 and which is adjacent to the periphery of the turntable 118. The outer end of the stud 168 carries a stop 174 which limits axial movements of the boss 170, and this boss is under the bias of a helical lifting spring 172 which operates between the underside of the boss and the end face of a cylindrical projection 121 which constitutes a connection between the stud 168 and the base 110. The function of the lifting spring 172 is to permanently bias the boss 170 against the stop 174, that is, in a direction to move the tone arm 136 and the stylus 166 away from the sound grooves in the exposed side of the disk 134.

The tone arm 136 further comprises a flexible arm member 176 of elastic material whose outer end is integral with the boss 170 and whose inner end is integral with a head 178 in which the stylus 166 is mounted. The arm member 176 is of rectangular cross section, see FIG. 4, and the configuration of the head 178 is such that the parts 176, 178 together form a T-shaped body. At least the member 176 of the tone arm 136 consists of readily flexible synthetic plastic material whose elasticity is such that, when the head 178 is subjected to the action of a force tending to move it toward the sound grooves, the arm member 176 is flexed and causes only slight axial displacement of the boss 170 against the bias of the lifting spring 172.

The aforementioned deformable retainer 164 comprises a leaf spring 180 of spring steel or the like whose outer end portion is clamped between the abutting edge portions of the base 110 and cover 112 and whose inner end portion overlaps the head 178. That side of the retainer spring 180 which faces the tone arm 136 is provided with a rail 182 which abuts against the outer end face of the head 178 and normally biases the stylus 166 into engagement with the disk 134. The head 178 slides along the rail 182 when the tip of the stylus 166 traces a selected sound groove and when the tone arm 136 turns about the axis of the stud 168 to move from a starting position (shown in full lines in FIG. 5) to a second position 136' which is indicated by phantom lines. The inner end portion of the spring 180 is rigidly connected to the diaphragm 184 of a loudspeaker which is accommodated in a horn 125 forming part of the cover 112. Thus, the head 178 transmits signals directly to the diaphragm 184 when the phonograph B is in actual use.

The spring 180 is held against twisting by an upright rod 186 which is fixed to or which is integral with the base 110 and which extends through an aperture 127 of the spring. The rod 186 is adjacent to a side wall of the housing 110–112.

The means for automatically returning the tone arm 136 to the starting position of FIG. 5 comprises a comparatively weak spring 188 which is connected to a pin 192 on the base 110 and to a second pin 190 provided at the underside of the arm member 176. The bias of this return spring is just sufficient to rock the tone arm from the phantom-line position 136' when the stylus 166 is out of contact with the disk 134 (see FIG. 6) and when this spring 188 is called upon to overcome friction between the boss 170 and the periphery of the stud 168.

Figure 6:
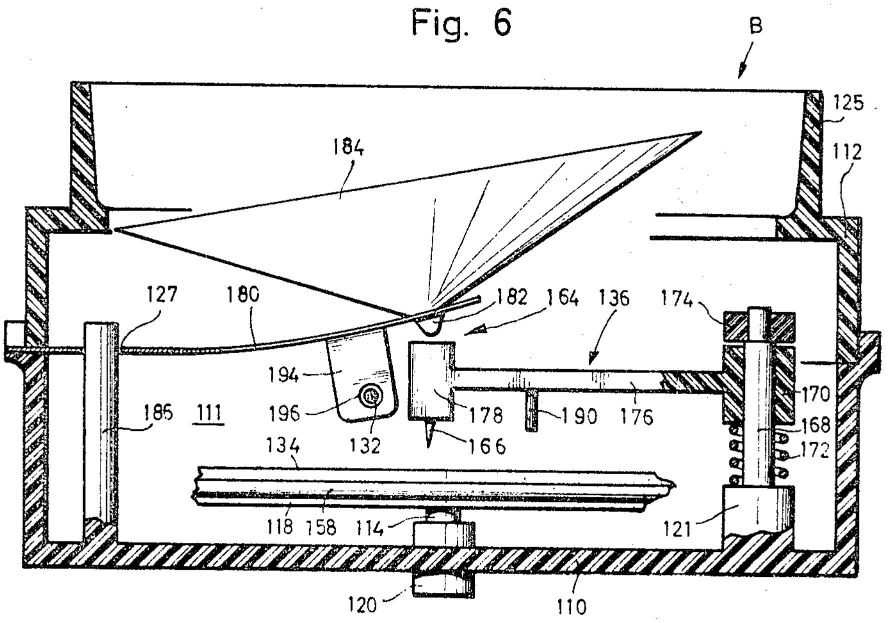
FIG. 6 is a transverse section as seen in the direction of arrows from the line 6—6 of FIG. 4, showing the tone arm of the sound reproducing mechanism in idle position when the stylus is spaced from the grooved side of of the record carrier.
Figure 7:
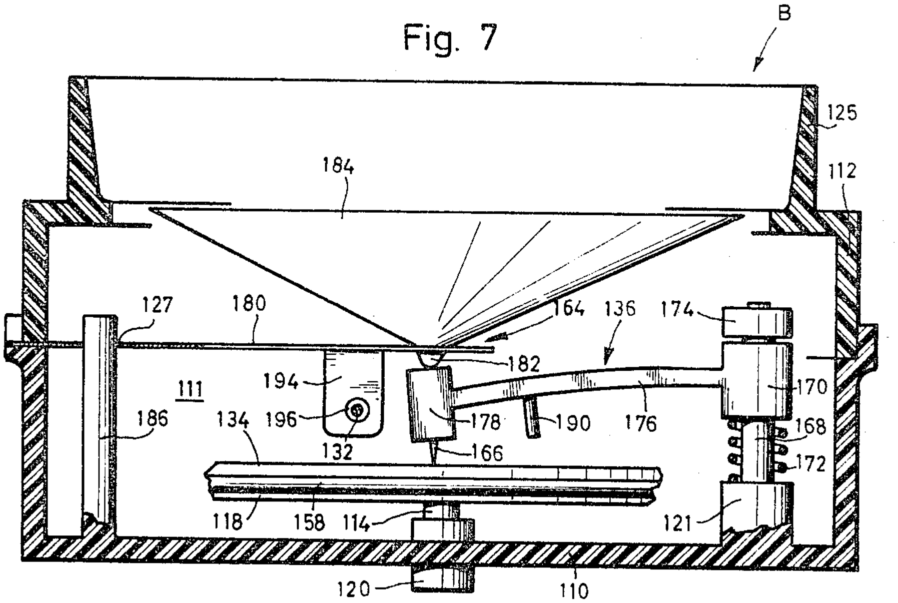
FIG. 7 is a similar transverse section through the phonograph of FIG. 4, but showing the tone arm in operative position.

The bias of the retainer spring 180 is sufficient to normally maintain the elastic arm member 176 of the tone arm 136 in the deformed position of FIG. 7 in which the stylus 166 engages the disk 134. This is the normal position of the retainer spring 180 which means that the phonograph B must be provided with means for deforming this retainer spring in a sense to enable the tone arm (and more particularly the arm member 176) to assume its undeformed position of FIG. 6 in which it can follow the bias of the return spring 188. The means for deflecting or deforming the retainer spring 180 to the position of FIG. 6 comprises a tubular guide 196 for the non-convoluted portion of the cord 132, and this guide is mounted at one end of a bracket 194 which may form an integral part of the retainer spring 180 and which is bent from the general plane of this spring to extend toward the exposed side of the disk 134, see particularly FIGS. 6 and 7. When the retainer spring 180 is not deformed, i.e., when the non-convoluted portion of the cord 132 is slack, the bore of the guide 196 is not located in a straight line which connects the sleeve 117 with the convolutions 129 on the core of the winding reel 128. Thus, the guide 196 normally deflects the non-convoluted portion of the cord 132 in a direction toward the sound grooves and in a manner as shown in FIG. 4 but, when the cord is under tension, it compels the guide 196 to move upwardly, as viewed in FIG. 4 or 7, and to assume the position of FIG. 6 in which the retainer spring 180 is deformed sufficiently to lift the rail 182 away from the head 178 and to permit the arm member 176 to lift the stylus 166 substantially axially of the disk and away from the sound grooves. At the same time, the retainer spring 180 moves the diaphragm 184 to the inclined position of FIG. 6. A guide eye 131 (see particularly FIG. 9) is provided between the core of the winding reel 128 and the tubular guide 196 to prevent displacement of convolutions 129 when the guide 196 moves with the retainer spring 180 toward or away from the disk 134. The eye 131 is secured to the base 110 by strips 133, see FIG. 5.

As explained in connection with FIGS. 1 to 3, the non-convoluted portion of the cord 132 is under stretch when the eye at the free end of this cord abuts against the sleeve 117 and also when the operator pulls the cord with a view to wind the spring 124. The cord 132 is slack when the spring 124 is free to unwind and drives the turntable 118 at a speed determined by the regulator 138. In other words, whenever the cord 132 is under tension, the retainer spring 180 assumes the position of FIG. 6 and permits the spring 188 to return the tone arm 136 to the starting position of FIG. 5. On the other hand, when the turntable 118 rotates, the retainer spring 180 automatically assumes the non-deformed position of FIG. 7 and presses the stylus 166 into a selected sound groove of the disk 134. As shown in FIG. 6, the deflection of the retainer spring 180 in response to stretching of the non-convoluted portion of the cord 132 may be such that the rail 182 is actually moved away from and out of actual contact with the head 178.

Figures 8, 9:
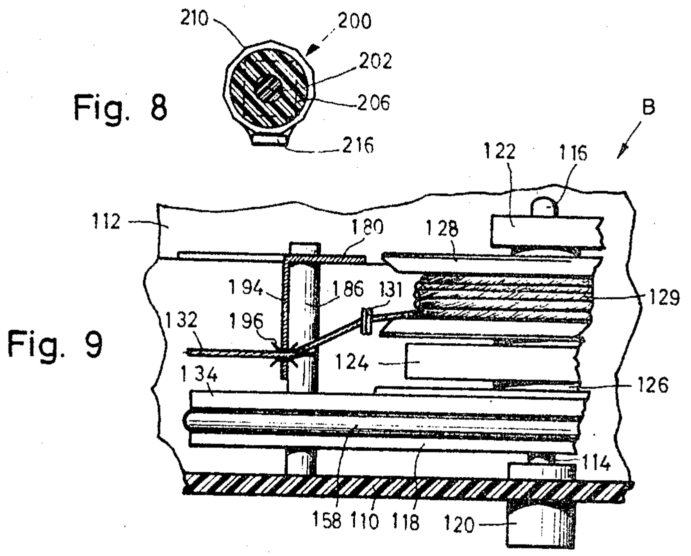
FIG. 8 is a horizontal section through an adjustable stop means for the tone arm, this section being taken along the line 8—8 of FIG. 4.
FIG. 9 is a fragmentary longitudinal section as seen in the direction of arrows from the line 9—9 of FIG. 5, showing the manner in which a tubular guide on the resilient retainer for the tone arm deflects the winding cord at the time the stylus of the tone arm traces a selected sound groove in the record carrier.

As explained hereinabove, the disk 134 is formed with a series of independent sound grooves each of which has its outermost convolution at a different distance from the periphery of the disk. In order to insure that the stylus 166 will trace such selected grooves in a desired sequence, the phonograph B comprises adjustable stop means 200 which determines the starting position of the tone arm 136 and which thus controls the initial position of the stylus with respect to the disk 134. This adjustable stop means 200 is shown in FIGS. 4, 5 and 8, and its main function is to determine the distance between the stylus 166 and the axis of the turntable 118 at the time the tone head 176 assumes its starting position, whereby the stylus is located above the outermost convolution of a selected sound groove. In the embodiment of FIGS. 4 to 9, the construction of the stop means 200 is such that it is automatically adjusted by the non-convoluted portion of the cord 132 when the latter is pulled with a view to tension the spring 124.

The stop means 200 comprises a stub shaft 202 which is fixed to the base 110 and which extends into the chamber 111 between the tubular guide 196 and the sleeve 117 at a point adjacent to the non-convoluted portion of the cord 132. The upper portion of the rotary member 204, as viewed in FIG. 4, assumes the form of an eccentric collar 208 which comes into actual abutment with the head 178 when the spring 188 returns the tone arm 136 to the starting position of FIG. 5. The lower end portion of the rotary member 204 comprises an annulus 210 whose periphery consists of a series of polygonal faces (see FIG. 8) one of which is always engaged by a flat arresting spring 216. The number of faces on the annulus 210 corresponds to the number of independent sound grooves in the disk 134, and the arresting spring 216 is fixed to the base 110 or to the stub shaft 202 so that it cannot rotate with the member 204. This arresting spring tends to prevent rotation of the member 204 in response to movements of the non-convoluted portion of the cord 132. Since the collar 208 is eccentric with respect to the shaft 202 (see particularly FIG. 5), the tone arm 136 assumes a different starting position if the member 204 changes its angular position against the bias of the arresting spring 216, whereby the tip of the stylus 166 is located above the outermost convolution of a selected sound groove.

The operation of the phonograph B is analogous to that of the phonograph A. Thus, when the non-illustrated eye at the outer end of the cord 132 abuts against the sleeve 117, the cord is stretched under the bias of the torsion spring 124 and deforms the retainer spring 180 which latter then assumes the position of FIG. 6 whereby the spring 188 is free to return the tone arm 136 to the starting position of FIG. 6 in which the head 178 abuts against the eccentric collar 208. When the user pulls the cord 132 with a view to store energy in the torsion spring 124, the non-convoluted portion of the cord rubs against the cylindrical median portion 206 of the rotary member 204 and causes this member to change its angular position against the bias of the arresting spring 216 so that the eccentric collar 208 compels the tone arm 136 to assume a new starting position and to move the stylus 166 into registry with a new sound groove. When the user releases the cord 132, the spring 124 is free to unwind and drives the turntable 118. At the same time, the cord 132 sags and permits the retainer spring 180 to reassume the position of FIG. 7 and to move the stylus 166 into the outermost convolution of the newly selected sound groove. When the stylus reaches the innermost convolution of such selected groove, the eye at the free end of the cord 132 strikes against the sleeve 117 and arrests the turntable 118 whereby the spring 124 stretches the non-convoluted portion of the cord 132 and the latter deforms the retainer spring 180 which then assumes the position of FIG. 6 and moves the stylus 166 axially of and away from the disk 134, thus permitting the spring 188 to return the tone arm 136 into abutment with the eccentric collar 208. The operation is then repeated as soon as the user pulls the cord 132 with a view to rewind the spring 124 and to simultaneously change the angular position of the collar 208 which latter then adjusts the starting position of the head 178 and moves the stylus 166 into alignment with a different sound groove.

The phonograph B is especially suited for use in talking dolls and similar toy devices, but its use is not restricted to toys. For example, and assuming that the phonograph B is mounted in a doll, the doll may actually carry on a conversation by asking or answering questions in a predetermined sequence. If the user wishes to skip a sound groove, he or she merely pulls the cord 132 to tension the spring 124 and thereupon holds the free end of the cord with a force sufficient to maintain the retainer spring 180 in the deformed position of FIG. 6 while still permitting the spring 124 to unwind and to gradually retract the cord into the chamber 111.

As indicated somewhat schematically in FIG. 9, the end portions of the bore in the tubular guide 196 diverge radially outwardly so that the guide 196 actually resembles a twin funnel to reduce friction with the cord to a minimum and to avoid premature destruction of the cord. Of course, the guide 64 and the sleeves 23, 117 may be constructed in similar fashion, and it is often sufficient to form only one end of a guide or of a sleeve in a manner to resemble a funnel. Such guides and sleeves may consist of a wide variety of metallic or plastic substances.

It is sometimes desirable to provide means for adjusting the bias of the return spring 188 so as to insure that this spring will not cause the stylus 166 to scratch the exposed side of the disk 134 by pivoting the tone arm 136 back to its starting position before the elastic arm member 176 will have a chance to reassume its unstressed position. For example, and as shown in FIG. 5, the bottom wall of the base 110 is formed with a slot 135 and the pin 192 is shiftable in this slot to thereby change the bias of the spring 188. The pin 192 may be held in a selected position merely by friction or by a set screw or the like.

By mounting the tone arm 136 on the housing 110–112 (rather than on the retainer as in the embodiment of FIGS. 1 to 3), I insure that the stylus 166 is always perpendicular to the plane of the sound grooves when the phonograph B is in actual use. The quality of sound reproduction deteriorates immediately if the inclination of the stylus with respect to the plane of the sound groove changes, and any such changes in the inclination of the stylus result in rapid wear on the disk and in accompanying deterioration of the sound reproduction. Therefore, even though the tone arm 136 and the retainer spring 180 cannot be mounted or detached as a unit, the construction of FIGS. 4–9 is often preferred because the reproduction of sound is very satisfactory for longer periods of time.

The elasticity of the arm member 17 should always be sufficient to rapidly return the head 178 to the position of FIG. 6 as soon as the non-convoluted portion of the cord 132 is under tension, i.e., as soon as the retainer spring 180 is compelled to assume its deformed position. Thus, and assuming that the bias of the return spring 188 is rather strong, the natural tendency of the arm member 176 to return to the position of FIG. 6 must be even stronger to insure that the movement of the head 178 axially of and away from the disk 134 precedes pivotal movement of the boss 170 about the stud 168 in order to avoid any scratching of the grooved side of the disk. Furthermore, the bias of the retainer spring 180 upon the head 178 must be strong enough to prevent pivotal movement of the tone arm 136 about the axis of the stud 168 when the stylus 166 engages the disk 134. In other words, the bias of the retainer spring 180 must be stronger than the bias of the return spring 188, and the spring 188 should not be tensioned to such an extent that it would prevent the elastic arm member 176 from returning to the position of FIG. 6 immediately upon deformation of the retainer spring.

The lifting spring 172 may be arranged to act between the hub 170 and the bottom wall of the base 110, and this spring may be replaced by one or more leaf springs or by other types of resilient means.

Figure 10:
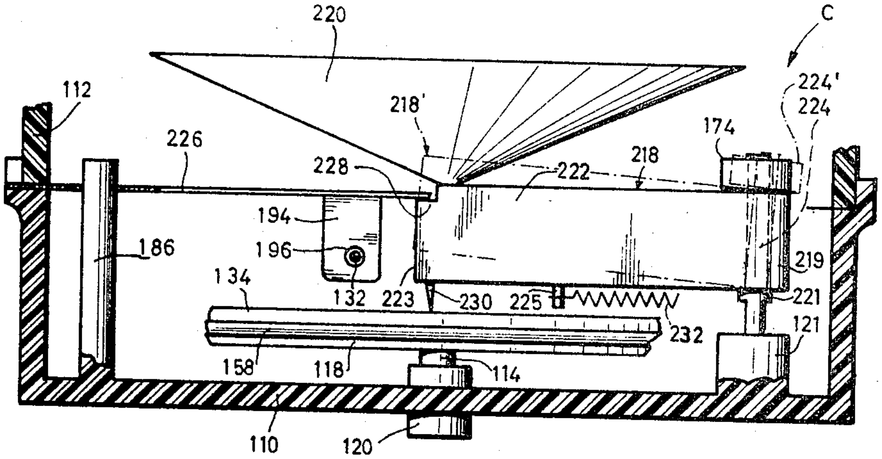
FIG. 10 is a fragmentary transverse section through a different phonograph wherein the diaphragm of the loudspeaker is rigidly secured to a tone arm which is rockable about the axis of a flexible stud.

The phonograph C of FIG. 10 is very similar to the phonograph B, and certain of its parts are identified by reference numerals which are used in FIGS. 4 to 9. The main difference between the phonographs B and C is that the latter comprises a modified tone arm 218 whose arm member 222 is rigid and is fixedly connected to the diaphragm 220 of a loudspeaker. The boss 219 at the outer end of the arm member 222 is rotatable on a flexible pivot member or stud 224 of elastic material which is mounted in the projection 121 of the base 110 and whose upper end portion, as viewed in FIG. 10, carries the stop 174. This elastic stud 224 further comprises a flange 221 which cooperates with the stop 174 to prevent axial movements of the boss 219.

The inner end portion of the arm member 222 is integral with a head 223 which supports the stylus 230 and whose outer side is formed with a notch or cutout 228 defining a shoulder for the inner end portion of a modified retainer spring 226. This retainer spring is not connected to the diaphragm 220 but is again provided with a bracket 194 for a tubular deforming guide 196 whose bore receives the non-convoluted portion of the cord 132. The arm member 222 comprises or carries a pin 225 for one end of a comparatively weak return spring 232 which tends to move the tone arm 218 to its starting position.

The elasticity of the stud 224 is such that it normally tends to assume the phantom-line position 224' and to thereby move the stylus 230 substantially axially of and away from the exposed side of the disk 134 because the tone arm 218 then assumes the phantom-line position 218'. However, the bias of the retainer spring 226 is stronger so that this spring normally compels the elastic stud 224 to assume its deformed position and to permit the stylus 230 to trace a selected sound groove in the disk 134. When the non-convoluted portion of the cord 132 is under stretch, the retainer spring 226 is deformed and permits the stud 224 to reassume the undeformed position 224' so that the spring 232 may return the tone arm 218 (in position 218') into abutment with a non-illustrated stop means, such as the stop means 200 of FIG. 5.

All that was said in connection with the elasticity of the arm member 178 applies to the flexibility of the stud 224. Thus, this stud should move the stylus 230 substantially axially of and away from the disk 134 before the return spring 232 can pivot the boss 219 about the axis of the stud. Also, the return spring 232 cannot pivot the tone arm 218 when the retainer spring 226 bears against the shoulder in the notch 228 of the head 223.

In all embodiments of the present invention, I normally prefer to use a comparatively weak return spring in order to insure that the wear on the disk in response to the bias of such return spring is negligible. In fact, the bias of the return spring may be so small that it may be disregarded when one calculates the bias of the retainer spring. Thus, the retainer spring must be just strong enough to compel the tip of the stylus to remain in a selected sound groove when the cord is not under stretch.

The turntable and the winding reel may form an integral unit which can be made of suitable metallic or plastic material. Plastics are preferred in toy devices because of lesser weight and because they can be shaped in less expensive machines.

Figure 12:
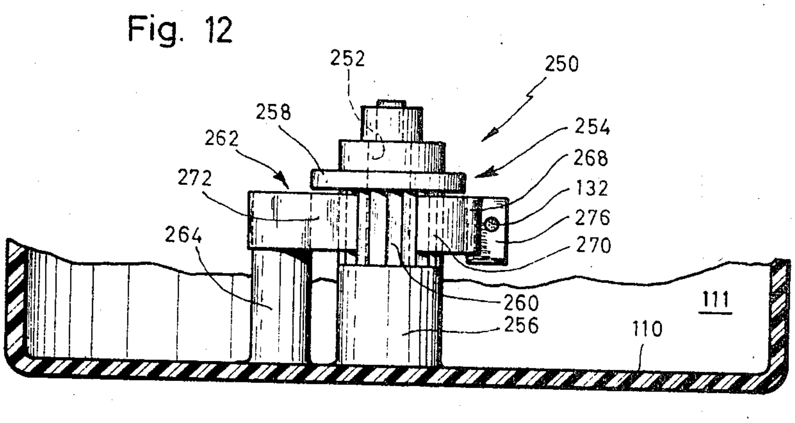
FIG. 12 is a transverse section through the housing of the phonograph as seen in the direction of arrows from the line 12—12 of FIG. 11.
Figure 11:
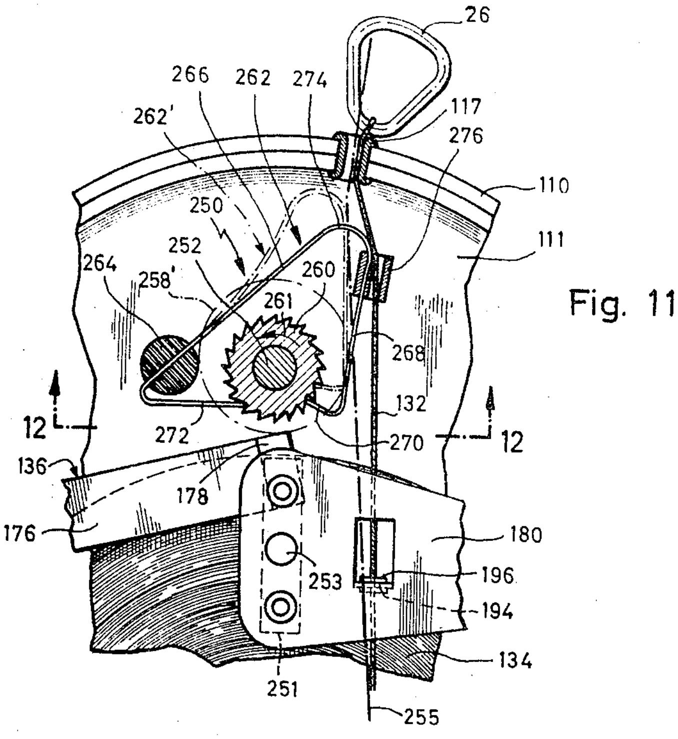
FIG. 11 is a fragmentary top plan view of a phonograph which is similar to the one shown in FIGS. 4 to 9 but which comprises a different stop means for the tone arm, certain parts of the stop means being shown in section and certain parts of the sound reproducing mechanism being broken away for the sake of clarity.

The adjustable stop means 250 of FIGS. 11 and 12 may be used to replace the stop means 200 in the phonograph B. The disk 134 again comprises a series of independent sound grooves each of which includes an outer convolution, and such outer convolutions are located at different distances from the periphery of the disk. Therefore, the stop means 250 also embodies an arrangement which is capable of arresting the head 178 of the tone arm 136 in different starting positions so that the stylus of the tone arm will be in registry with the outer convolution of a selected sound groove. The construction of the retainer spring 180 is the same as described in connection with FIGS. 4 to 9 excepting that the underside of this spring supports a slightly differently configurated rail 251 which cooperates with the head 178 to transmit vibrations of the stylus to a non-illustrated diaphragm which is mounted on a pin 253 provided on the inner end portion of the retainer spring 180. The bracket 194 and the guide 196 are identical with those shown in FIGS. 6 and 7. The outer end portion of the cord 132 is connected with an eye 26 which may abut against the sleeve 117 to prevent further unwinding of the non-illustrated torsion spring.

The stop means 250 comprises a stub shaft 252 which is fixed to the base 110 and which supports a rotary member 254. The stub shaft 252 may form an integral part of a boss 256 which is integral with the inner side of the base 110 and which defines a supporting shoulder for the inner end face of the rotary member 254, the latter comprising at its upper end, as viewed in FIG. 12, an eccentric collar 258 which performs the same function as the collar 208 of the stop means 200 by determining the exact starting position of the head 178. The lower portion of the rotary member 254 assumes the form of a ratchet wheel 260 whose teeth cooperate with two spaced pallets or prongs 270, 272 of a resilient pawl 262 which latter assumes the form of a band spring (see particularly FIG. 12) and whose straight section or leg 266 is anchored in a bolt 264 secured to the base 110. The pawl 262 is a substantially U-shaped body including the aforementioned section or leg 266, a second section or leg 268, and a curved connecting web 274 which is disposed between the sections 266, 268. The pallets 270, 272 are respectively integral with and are bent inwardly from the free ends of the sections 268, 266. The section 268 carries a tubular muff 276 whose bore receives the non-convoluted portion of the cord 132, and the mounting of the pawl 262 is such that the muff 276 normally tends to deflect the non-convoluted portion of the cord from a straight path between the guide 196 and the sleeve 117, this straight path being indicated by a heavy phantom line 255. When the user grasps the eye 26 and pulls the cord 132 in a direction to withdraw it from the chamber 111, the cord is stretched and thereby deforms the section 266 so that the pallet 270 rotates the ratchet wheel 260 in an anticlockwise direction, as viewed in FIG. 11 (see the arrow 261), and changes the angular position of the eccentric collar 258. The pawl 262 then assumes the phantom-line position 262', and such deformation of the pawl is sufficient to move the stylus into alignment with a different sound groove of the disk 134. The pallet 272 is sufficiently flexible to permit anticlockwise angular displacements of the ratchet wheel 260 but, on the other hand, is also sufficiently rigid to prevent clockwise rotation of this wheel. In other words, when the pallet 270 rotates the ratchet wheel 260, the pallet 272 merely rides over the teeth of the wheel so that it serves as a holding means in contrast to the pallet 270 which serves to transmit motion to the wheel 260 and to the eccentric collar 258.

As soon as the cord 132 slackens, the inherent resiliency of the section 266 compels the pawl 262 to return to the full-line position of FIG. 11 and to move the non-convoluted portion of the cord 132 away from the line 255 so that the cord may again deform the pawl when the operator pulls the eye 26 in order to tension the torsion spring which rotates the turntable.

Of course, the number of teeth on the ratchet wheel 260 and the position of the muff 276 are selected in such a way that each consecutive angular displacement of the ratchet wheel causes the stylus to assume a position of alignment with the outermost convolution of a different sound groove.

The sections 266, 268 of the pawl 262 make an acute angle with each other and, since the pallet 270 is shorter than the pallet 272, the latter is more resilient and rides over the teeth of the ratchet wheel when this wheel rotates in response to deflection of the muff 276. The eccentricity of the collar 258 is indicated in FIG. 11 by phantom lines, as at 258'. The muff 276 is located close to the junction between the web 274 and the section 268 to insure that the muff deforms the section 266 in response to tensioning and resultant stretching of the cord 132.

It is to be noted that the stop means 200 and 250 serve to move the tone arm 136 into a series of different starting positions and that the tone arm assumes such starting positions in a given sequence which is determined by the configuration of the eccentric collar 208 or 258 and by the extent of angular displacement of such collars in response to tensioning of the cord.

Figure 13:
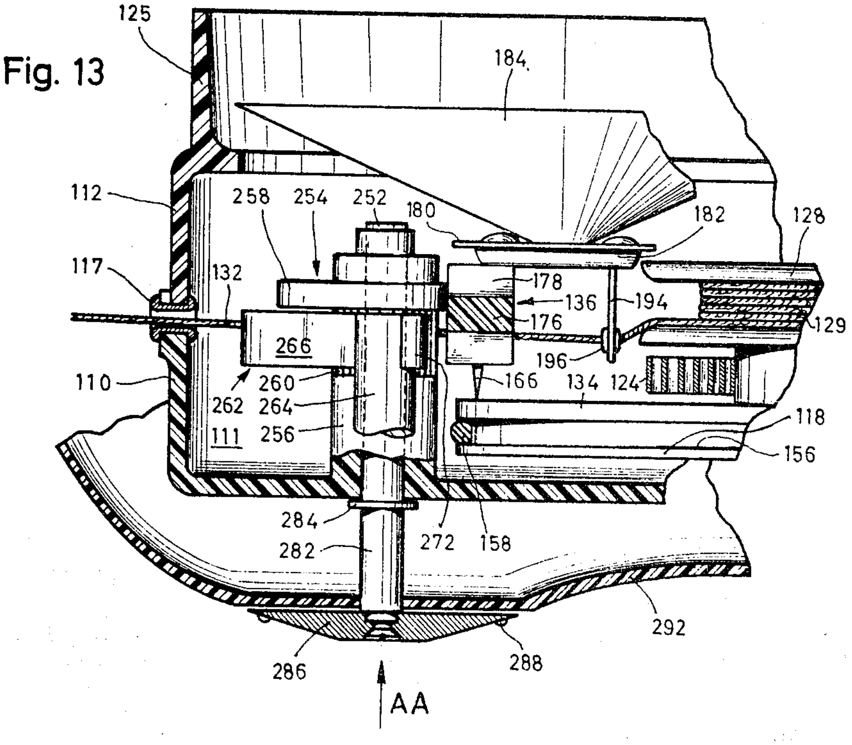
FIG. 13 is a fragmentary longitudinal section through the phonograph of FIGS. 4 to 9 and through a portion of a toy device in which the phonograph is installed, further showing a different stop means which is combined with a dial so that the starting position of the tone arm may be adjusted by the winding cord or by manual adjustment of the dial.
Figure 14:
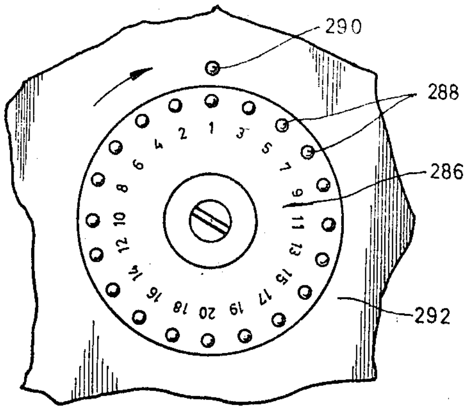
FIG. 14 is a front elevational view of the dial as seen in the direction of arrow AA in FIG. 13.

The stop means of FIGS. 13 and 14 embodies all features of the stop means 250 and additionally comprises a selector device which enables the user to choose the position of the collar 258 at his or her own wish so that the stylus 166 will trace any desired sound groove in the disk 134. This selector device comprises a shaft 282 which is coupled to the stub shaft 252 and which projects from the base 110. A washer 284 which is provided at the outer side of the base 110 cooperates with the rotary member 254 to hold the shaft 282 against axial displacements with respect to the boss 256. The reference numeral 292 indicates a portion of the body of a talking doll or another toy device from which the shaft 282 extends to support at its outer end a dial 286 which is provided with numbered markers 288, and each of these markers may be brought into registry with a fixed marker 290 provided at the outer side of the body 292. By turning the dial 286, the operator simultaneously turns the eccentric collar 258 so as to select at will the starting position of the tone arm 136 and to thereby select a predetermined sound groove which is traced by the stylus 166 when the cord 132 is slack and permits the retainer spring 180 to move the tone arm to the position of FIG. 13.

It will be readily understood that the pallets 270, 272 of the pawl 262 require minimal modifications to permit rotation of the ratchet wheel 260 in a clockwise and in an anticlockwise direction so that the dial 286 may be used to turn the wheel 260 in and counter to the direction which is indicated in FIG. 11 by the arrow 261. In other words, the stop means of FIGS. 13 and 14 may be adjusted by the cord 132 (through the pawl 262) or by the dial 286 which latter, if desired, may be rotated in a clockwise or anticlockwise direction so as to rapidly advance a selected movable marker 288 into registry with the fixed marker 290.

Figure 15:
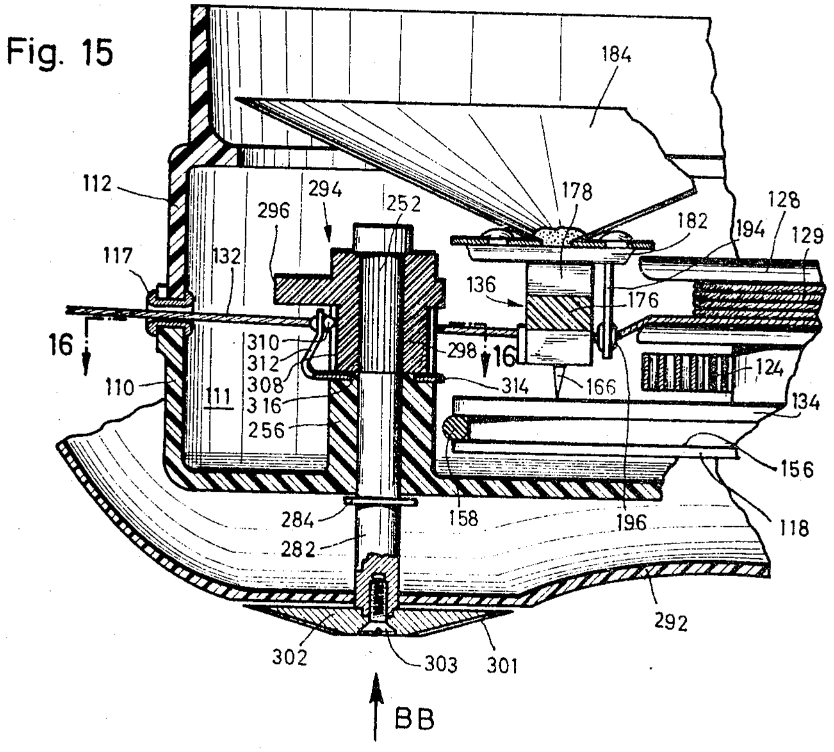
FIG. 15 is a fragmentary longitudinal section through the phonograph of FIGS. 4 to 9, further showing in axial section a different stop means which is manipulated by hand to selectively move the tone arm to any of a series of starting positions.
Figure 16:
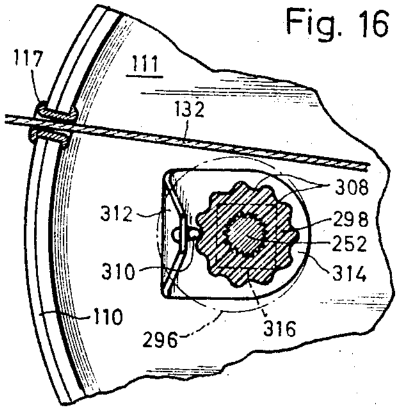
FIG. 16 is a fragmentary horizontal section as seen in the direction of arrows from the line 16—16 of FIG. 15.
Figure 17:
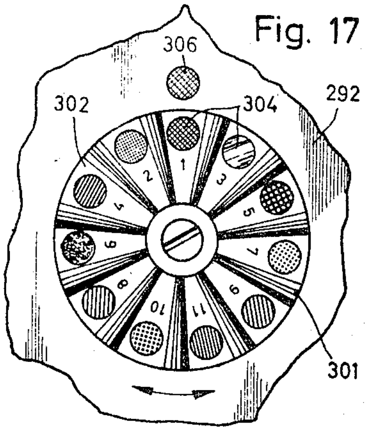
FIG. 17 is a front elevational view of a dial which forms part of the stop means in the phonograph of FIGS. 15 and 16, the view of FIG. 17 being taken in the direction of arrow BB in FIG. 15.

Referring to FIGS. 15, 16 and 17, there is shown another form of adjustable stop means which is mounted in the internal chamber 111 of a housing including a base 110 and a cover 112. This stop means comprises a rotary member 294 including an integral eccentric collar 296 which comes into actual abutment with the head 178 when the tone arm 136 is compelled by its return spring to move to a starting position and to align the stylus 166 with a selected sound groove of the disk 134.

The manner in which the stub shaft 252 is connected with the shaft 282 for a dial 302 is the same as described in connection with FIGS. 13 and 14. Intermediate the eccentric collar 296 and the end face of the boss 256, the rotary member 294 comprises a fluted or channeled portion 298 which is formed with axially parallel equidistant channels 308 (see particularly FIG. 16) each of which may receive a projection or finger 310 carried by the upstanding leg 312 of a flat arresting spring whose other leg 314 is secured to the boss 256 so that it cannot rotate with the member 294.

The exposed face of the dial 302 is provided with differently colored and differently numbered markers 304 each of which may be moved into registry with a fixed marker 306 at the outer side of the body 292 through which the shaft 282 extends. The exposed face of the dial 302 is formed with radial ribs 301 which are disposed between the markers 304 to facilitate turning of the dial which latter is fitted onto a non-circular portion of the shaft 282 and is held thereon by a screw 303.

The number of channels 308 in the periphery of the cylindrical portion 298 equals the number of independent sound grooves in the exposed side of the disk 134. The horizontal portion 314 of the arresting spring which biases the finger 310 against the portion 298 is fitted onto a non-circular end section 316 of the boss 256 and is thus prevented from sharing rotary movements of the member 294.

In the embodiment of FIGS. 15 to 17, the non-convoluted portion of the cord 132 bypasses the rotary member 294 so that the latter may be adjusted solely by the dial 302 which can be turned in a clockwise or anticlockwise direction. In other words, the stop means for the tone arm 136 may be adjusted independently of the winding of the torsion spring 124 if the stop means assumes the form shown in FIGS. 15 to 17. Of course, the construction of FIGS. 13 and 14 offers the additional advantage of permitting automatic adjustments in the starting position of the tone arm so that, if desired, the sound grooves in the disk 134 may be traced in a predetermined sequence. It goes without saying that the stop means of FIGS. 15 to 17 may be modified so as to be adjustable by the cord 132 and by the dial 302. All that is necessary is to provide on the rotary member 294 a truly cylindrical portion which engages the cord and which is angularly displaced by friction when the user pulls the cord in a direction to the left, as viewed in FIG. 15.

In certain conventional phonographs of which I am aware at this time, the winding cord is directly coupled to the tone arm so that the tone arm is moved by friction and away from the disk when the user pulls the cord in order to store energy in the torsion spring which drives the turntable. A serious drawback of such conventional phonographs is that the stylus is likely to damage the disk if the cord happens to drag the tone arm along rather than to move the stylus away from the sound grooves. Therefore, the phonograph of my invention is constructed in such a way that the tone arm need not be directly engaged by the cord and that the means which biases the stylus away from the sound groove or grooves acts in the axial direction of the turntable in order to insure that the stylus is moved to a safe distance from the sound groove or grooves before the tone arm begins to pivot back to its starting position. Thus, any damage to the sound grooves is prevented by simply avoiding any direct frictional engagement between the cord and the tone arm. The return spring is too weak to drag the stylus along the exposed side of the disk when the tone arm is biased by the retainer spring 34, 180 or 226. Furthermore, if the cord jams, the stylus cannot be dragged along the exposed side of the disk because, if the cord jams when it is under tension, the retainer spring holds the tone arm in engagement with the disk (at which time the return spring is too weak to cause pivotal movements of the tone arm). On the other hand, if the cord jams when it is not under tension, the tone arm is free to move its head axially of and away from the turntable and the return spring is then strong enough to pivot the tone arm back to its starting position. Thus, any tensioning and resultant stretching of the cord merely serves to permit movement of the tone arm axially of and away from the turntable, and the return movement of the tone arm back to its starting position occurs independently of the cord.

Of course, the cord 24 or 132 need not always be pulled by hand. For example, the free end of the cord may be secured in the arm or leg of a talking doll or another talking or musical toy device so that the torsion spring is wound in response to movements of the arm or leg when the toy device walks or moves its arms.

In certain instances, the adjustable stop means of the embodiments shown in FIGS. 4 to 17 may be replaced by a suitable one-way clutch which insures that the head of the tone arm assumes a predetermined starting position after each winding of the torsion spring. Such clutch has been shown in FIGS. 1 to 3 and, if utilized, its parts are installed in the operative connection between the turntable and the spring motor which drives the turntable and the disk.

Figure 1:
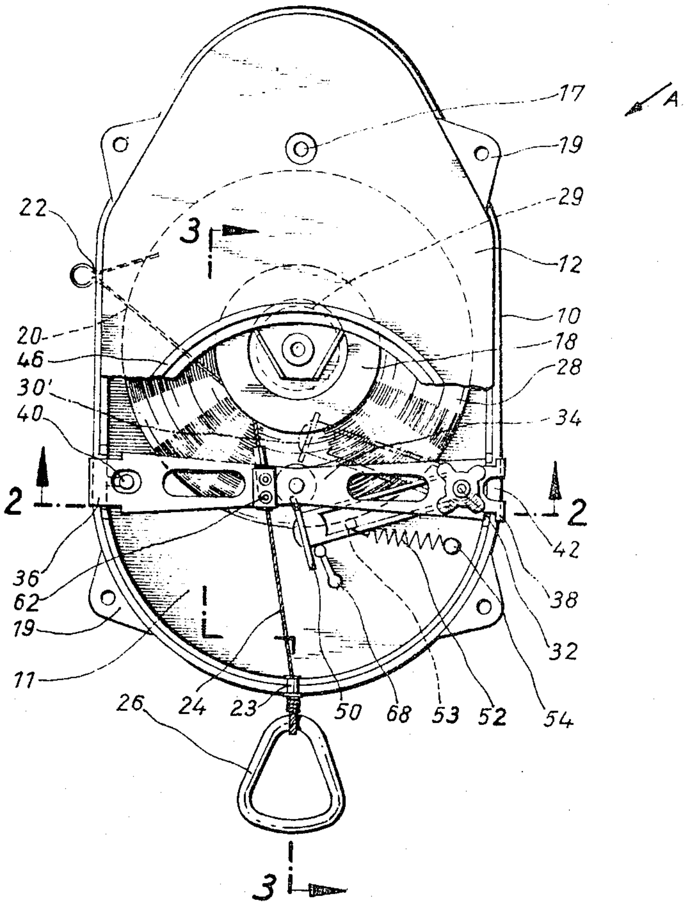
FIG. 1 is a top plan view of a phonograph which embodies one form of my invention, a portion of the cover being broken away to reveal certain elements of the sound reproducing mechanism which is accommodated in the internal chamber of the housing.
Figure 18:
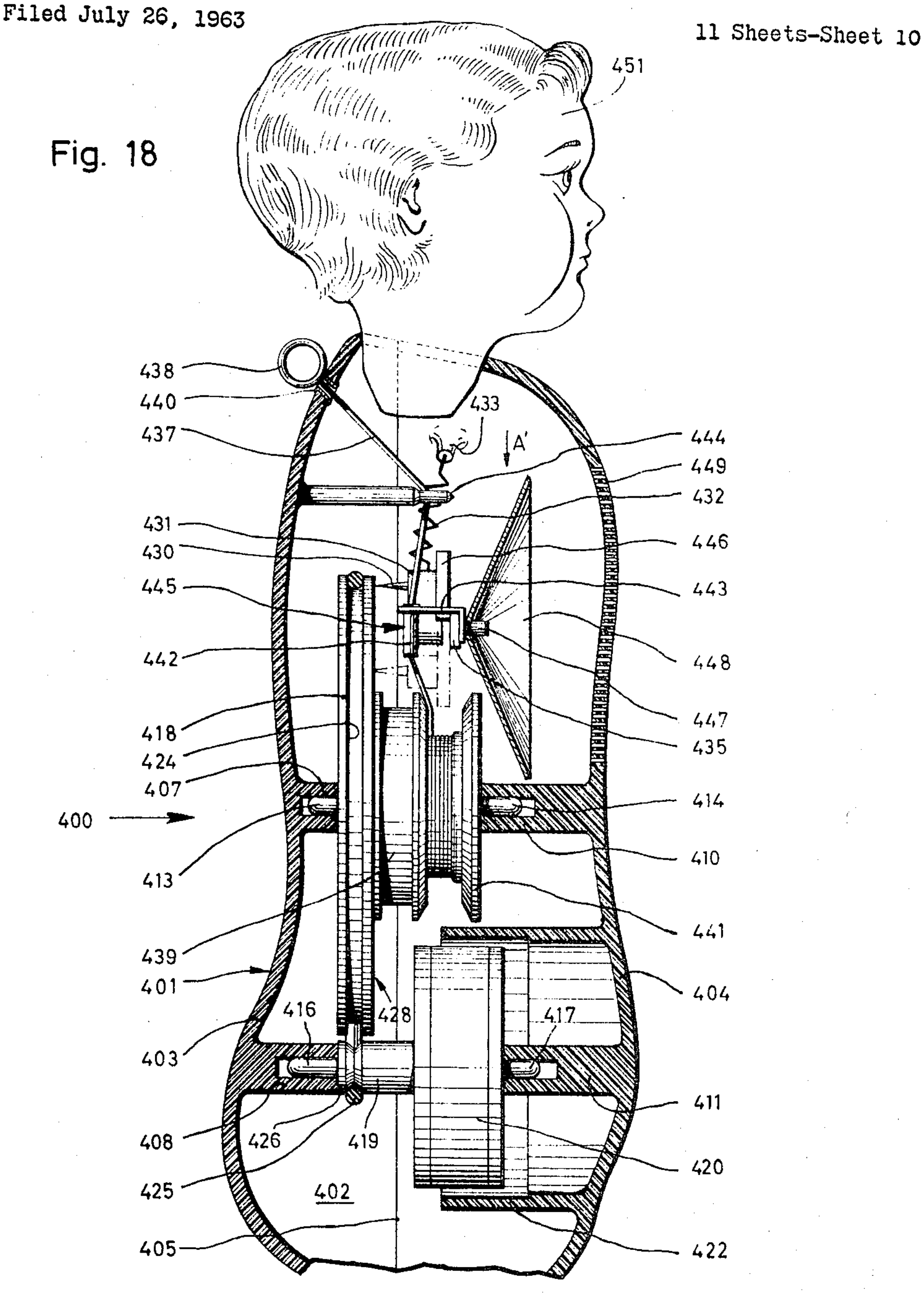
FIG. 18 is a central vertical section through the torso of a toy device which serves as a housing for a phonograph similar to the one shown in FIGS. 1 to 3.

FIG. 18 illustrates a toy device 400 which embodies a slightly modified toy phonograph A′ similar to the one shown in FIGS. 1 to 3. The main difference between the phonographs A and A′ is that the body (and more particularly the trunk 401) of the toy device 400 replaces the housing 10–12 of FIGS. 1 to 3, i.e., that the phonograph A′ does not have its own housing.

The toy device 400 assumes the form of a talking doll whose torso 401 defines an internal chamber 402 bounded by a rear section 403 and a front section 404. These sections are welded, glued or otherwise secured to each other along a line 405 and preferably consist of suitable synthetic plastic material which is resistant to wear, which more or less is dentproof, and which may be readily cleaned with a wet cloth or the like.

In accordance with an important feature of my invention, the sections 403, 404 are respectively provided with inwardly extending bearing sockets 407, 408 and 410, 411. The sockets 407, 408 are respectively aligned with the sockets 410, 411 to receive pairs of coaxial trunnions 413, 414 and 416, 417. The trunnions 413, 414 constitute the end portions of a shaft for a turntable 418 whose construction is similar to that of the turntable 14. The trunnions 416, 417 constitute the end portions of a second shaft 419 which is parallel with the axis of the turntable 418 and which carries a speed regulator 420 whose construction is the same as or similar to that of the speed regulator 138 in FIGS. 4 and 5. The front section 404 carries a cylindrical shield 422 which surrounds the casing of the speed regulator 420 and which stiffens the torso 401 to insure that the latter offers greater resistance to deformation such as would tend to change the position of the speed regulator with respect to the turntable 418. The latter is formed with a circumferential groove 424 which receives an endless belt 425 and this belt is trained around a small pulley 426 which is rigid with the shaft 419 to insure that the shaft 419 rotates in response to rotation of the turntable. The manner in which the speed regulator 420 controls the rotation of the turntable was described in connection with FIGS. 4 and 5.

The record carrier 428 which is provided with one or more sound grooves is assumed to be integral with the turntable 418 and its grooved side faces the front section 404. The stylus 430 is mounted at one end of a tone arm 431 which is biased by weak return spring 432, the free end of this spring being anchored in an internal projection 433 of the front section 404 in such position that, in addition to moving the tone arm 431 to the full-line starting position of FIG. 18, the spring 432 also tends to move the stylus 430 away from the adjacent grooved side of the record carrier 428. In other words, that end of the return spring 432 which is anchored in the projection 433 is more distant from the record carrier than the other end which is secured to the tone arm 431 whenever the stylus 430 traces a sound groove. The tone arm 431 is rotatable about a stud (not shown) which is mounted on a resilient retainer 435 corresponding to the retainer 34 of FIG. 1. This retainer 435 normally tends to maintain the stylus 430 in contact with the record carrier 428 but its median portion may be flexed axially of and away from the turntable 418 when the non-convoluted portion of a flexible cord 437 is tensioned in response to a pull exerted upon an eye 438 or when a torsion spring 439 is permitted to move the eye 438 into abutment with a guide sleeve 440 provided in the rear section 403. FIG. 18 illustrates the cord 437 in a position its non-convoluted portion assumes just before it is tensioned by the unwinding spring 439. As shown, the major portion of the cord 437 is convoluted around the core of a reel 441 which is coaxial with the turntable 418. The non-convoluted portion of the cord 437 extends first through a tubular guide 442 which is secured to the retainer 435 by means of a bracket 443 and thereupon through a slot provided in a deflecting column or post 444 which is rigid with the rear section 403 and which extends into the chamber 402 at a point between the guide 442 and the guide sleeve 440. The parts 442, 443 together constitute a deflecting or deforming device 445 for the retainer 435.

The head of the tone arm 431 carries a signal transmitting bar 446 which slides along a supporting bolt 447 mounted on the retainer 435 and arranged to support a loudspeaker diaphragm 448. The open side of the diaphragm 448 is inwardly adjacent to a perforated or apertured wall portion 449 of the front section 404.

The ends of the retainer 435 are secured to the torso 401 in any suitable manner analogous to that shown in FIG. 1, and the inner end position of the stylus 430 is shown in phantom lines.

The operation of the phonograph A' is analogous to that of the phonograph A and requires no detailed explanation. It suffices to say that the phonograph A' will produce a series of sounds as soon as the user exerts a pull on the eye 438 and thereupon releases the eye so that the spring 439 is free to unwind and to rotate the turntable 418 at a speed determined by the regulator 420. As soon as the spring 439 is free to unwind, the non-convoluted portion of the cord 437 becomes slack and permits the retainer 435 to move the stylus 430 into the outermost convolution of a selected sound groove, the stylus having been moved into registry with such outermost convolution by the return spring 432 which is free to pivot the tone arm 431 as soon as the central portion of the retainer 435 is deformed in response to tensioning of the non-convoluted portion of the cord. It goes without saying that the phonograph A' may be equipped with stop means of the type shown in FIGS. 4, 12 or 15, and that such stop means may be adjusted by a dial in a manner as shown in FIG. 13 or 15.

Figure 19:
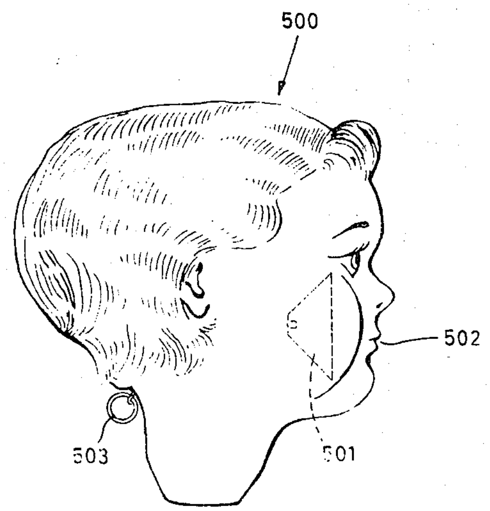
FIG. 19 is a side elevational view of a head which forms part of a talking doll and which accommodates a phonograph in such a way that the walls of the head constitute a housing for the phonograph.

Referring finally to FIG. 19, there is shown the head 500 of a toy device with a built-in phonograph having a loudspeaker diaphragm 501 which is adjacent to the mouth 502, and an eye 503 which is adjacent to the nape of the head. The remaining parts of the phonograph are the same as in the phonograph A' of FIG. 18 and were omitted for the sake of clarity.

An important advantage of a toy device whose head is provided with a built-in toy phonograph is that the reproduction of sound is more realistic because the sound is emitted through the mouth. Of course, the head 451 of the toy device 400 in FIG. 18 may be equipped with a similar phonograph so that the toy device 400 will then comprise two phonographs which may be useful if the toy device is used in imitation of a ventriloquist capable of extended conversation or capable of producing a series of sounds other than normal speech. Thus, the phonograph or phonographs of FIGS. 18 and 19 may be built into toy devices which imitate creatures of the animal kingdom, trains which are capable of whistling and reproducing the sound of wheels rolling on rails, boats or ships which whistle and which produce sounds in imitation of the sound produced by a propeller screw, and many others.

A very important advantage of a toy device whose phonograph is without a separate housing (i.e., wherein the torso, the head or another body portion of the toy device simultaneously serves as the sole housing for one or more phonographs is that the phonograph and/or or the toy device may be produced at reduced cost, that it is not necessary to provide separate fasteners which secure the phonographs to the toy device, that the loudspeaker diaphragm may be moved closer to such portions of the toy device which are most likely to create the impression of a live creature or a full-sized apparatus which is being imitated by the toy device, that the dimensions of the toy device may be reduced to a minimum so that even a very small doll or a like toy may be equipped with one or more phonographs, and that the wear on the cord is reduced considerably because the cord must extend through a lesser number of tubular members. This will be readily understood by comparing the phonograph A of FIG. 1 with the phonograph A' of FIG. 18. Thus, were the phonograph A built into the toy device 400, the cord 24 would extend through the guide sleeve 23 of the housing 10–12 and thereupon through the guide eye 440 of the rear section 403 with resultant increase in wear. The column 444 of FIG. 18 may be omitted. Furthermore, it is rather simple to mold the sections 403, 404 or the halves of the head 500 with integral bearing sockets, studs, posts, columns, pins and similar parts which support or otherwise cooperate with rotary and/or stationary parts of a toy phonograph.

It is further obvious that a phonograph without a separate housing will occupy less space than a phonograph of the type shown, for example, in FIGS. 1 to 3, and, therefore, the overall dimensions of the toy device 400 or of the head 500 are not increased or must be increased only slightly in order to accommodate one or more phonographs. Also, it is less time-consuming to repair a talking doll if the phonograph is accessible as soon as one opens the torso or the head of the doll instead of being compelled to open the doll, to separate the housing of the phonograph and to open the housing prior to gaining access to the sound reproducing mechanism.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A phonograph, comprising a rotary disk having a side provided with sound groove means; a rewindable spring for rotating said disk; means for winding said spring including a cord which is stretched when the spring is held against unwinding and which is slack when the spring unwinds to rotate said disks; a tone arm having a first end including a stylus which overlaps the grooved side of said disk and a second end; pivot means supporting said second end for movement about an axis which is substantially parallel with the axis of said disk so that the tone arm may move said stylus between a starting position in which the stylus is nearer to and a second position in which the stylus is more distant from the periphery of said disk; resilient lifting means for biasing said tone arm axially of said pivot means so as to move said stylus away from said disk; a resilient retainer engaging said tone arm to hold said stylus in engagement with said disk against the bias of said lifting means so that, when the spring unwinds to rotate the disk, the stylus is compelled to trace said groove means and moves from said starting position to said second position, said retainer being deformable to permit movement of said stylus under the bias of said lifting means; a guide connected with said retainer and slidably receiving said cord to deform the retainer in response to stretching of said cord; and resilient means for automatically returning the stylus to said starting position when said retainer is deformed and the stylus is spaced from said disk under the bias of said lifting means.

2. A sound reproducing apparatus, comprising a rotary disk having an exposed side provided with sound groove means; a motor including a rewindable spring for rotating the disk; means for winding said spring including a flexible element which is tensioned by said spring when the spring is held against unwinding and which is slack when the spring unwinds to rotate the disk; a tone arm having a first end including a stylus which overlaps the exposed side of said disk and a second end, said tone arm being arranged to bias the stylus substantially axially of and away from said disk; pivot means supporting said second end for movement about an axis which is substantially parallel with the axis of said disk so that the tone arm may move said stylus between a starting position in which the stylus is nearer to and a second position in which the stylus is more distant from the periphery of said disk; resilient retainer means normally engaging the first end of said tone arm to hold the stylus in engagement with said disk so that, when the spring unwinds to rotate the disk, the stylus is compelled to trace the groove means and travels from said starting position to said second position, said retainer means being deformable to permit automatic movement of the stylus substantially axially of and away from the exposed side of said disk; deforming means connected with said retainer means and slidably engaging said flexible element to deform said retainer means in response to tensioning of said flexible element; and resilient means for automatically returning the tone arm and the stylus to said starting position when said retainer means is deformed and the stylus is spaced from said disk.

3. A sound reproducing apparatus as set forth in claim 2, wherein the first end of said tone arm defines a shoulder which is engaged by said retainer means when the flexible element is slack.

4. A sound reproducing apparatus, comprising a housing defining an internal chamber; and a sound reproducing mechanism accommodated in said chamber, said mechanism comprising a rotary disk, a rewindable spring for rotating the disk, means for winding the spring including a flexible element which extends from said housing, said flexible element being stretched when the spring is held against unwinding and being slack when the spring unwinds to rotate the disk, a stylus overlapping said disk and movable between a starting position at a first distance and a second position at a second distance from the periphery of said disk, deformable retainer means normally biasing said stylus into engagement with the disk so that, when the spring unwinds to rotate the disk, the stylus is compelled to travel from said starting position to said second position, deforming means responsive to stretching of said flexible element for deforming said retainer means so that the stylus may be disengaged from said disk, and means comprising a resilient member for automatically returning the stylus to said starting position when the stylus is disengaged from said disk.

5. A sound reproducing apparatus as set forth in claim 4 further comprising a tone arm having a head connected with said stylus and an arm member, said resilient member having a first end connected with said housing and second end connected with said arm member.

6. A sound reproducing apparatus as set forth in claim 5, wherein said tone arm is elastic to bias said stylus in a direction substantially axially of and away from said disk, and wherein said arm member and said head together form a T-shaped body.

7. A sound reproducing apparatus as set forth in claim 4, further comprising means for adjusting the bias of said resilient member.

8. A sound reproducing apparatus, comprising a rotary disk; a rewindable spring for rotating the disk; means for winding the spring including a flexible element which is stretched when the spring is held against unwinding and which is slack when the spring unwinds to rotate the disk, speed regulator means for controlling the rotational speed of said disk when the spring unwinds, said regulator means comprising a centrifugal governor, means for driving said governor in response to rotation of said disk when the spring unwinds, said driving means comprising one-way clutch means which rotates the governor when the spring unwinds and which disconnects the governor from the disk when the flexible element is operated to rewind the spring, said one-way clutch means comprising a hollow cylindrical member connected with said governor, a shaft driven by said spring and rotatably extending into said cylindrical member, and a torsion spring having one end anchored in said shaft and another end frictionally engaging the internal surface of said cylindrical member; a stylus overlapping said disk and movable between a starting position at a first distance and a second position at a second distance from the periphery of said disk; deformable retainer means normally biasing said stylus into engagement with said disk so that, when the spring unwinds to rotate the disk, the stylus is compelled to travel from said starting position to said second position; deforming means responsive to stretching of said flexible element for deforming said retainer means so that the stylus may be disengaged from said disk; and means for automatically returning the stylus to said starting position when the stylus is disengaged from said disk.

9. A sound reproducing apparatus as set forth in claim 8, further comprising a turntable supportingly connected with said disk and operatively connected with said first mentioned spring, and a belt trained around said turntable and said shaft to drive said shaft in response to winding and unwinding of said spring.

10. A sound reproducing apparatus, comprising a rotary disk, a rewindable spring for rotating the disk; means for winding the spring including a flexible element which is stretched when the spring is held against unwinding and which is slack when the spring unwinds to rotate the disk, said flexible element being movable to and from an inner end position in which it is tensioned by said spring; a stylus overlapping said disk and movable between a starting position at a first distance and a second position at a second distance from the periphery of said disk; deformable retainer means connected with and normally biasing said stylus into engagement with said disk so that, when the spring unwinds to rotate the disk, the stylus is compelled to travel from said starting position to said second position; deforming means responsive to stretching of said flexible element for deforming said retainer means so that the latter moves said stylus away from said disk when said flexible element stretches in response to tensioning of the latter by said spring when said flexible element is in said inner end position thereof; and means for automatically returning the stylus to said starting position when the stylus is disengaged from said disk.

11. In a doll, in combination, a body portion defining an internal chamber and an outer surface constituting part of the exterior surface of the doll body, said body portion having a plurality of supporting elements provided in said chamber, and said body portion having an opening; and a sound reproducing apparatus accommodated in said chamber, said apparatus comprising a rotary disk, a rewindable spring for rotating the disk, means for winding the spring including a flexible element which is stretched when the spring is held against unwinding and which is slack when the spring unwinds to rotate the disk, a portion of said flexible element extending through said opening, a stylus overlapping said disk and movable between a starting position at a first distance and a second position at a second distance from the periphery of said disk, deformable retainer means normally biasing said stylus into engagement with said disk so that, when the spring unwinds to rotate the disk, the stylus is compelled to travel from said starting position to said second position, deforming means responsive to stretching of said flexible element for deforming said retainer means so that the stylus may be disengaged from said disk, means for automatically returning the stylus to said starting position when the stylus is disengaged from said disk, said winding means and said disk having a common shaft which is rotatably mounted in said supporting elements and said body portion constituting the sole housing for said sound reproducing apparatus.

12. In a doll, in combination, a body portion defining an internal chamber and an outer surface constituting part of the exterior surface of the doll body, said body portion having a plurality of supporting elements provided in said chamber, said body portion having an opening; and a sound reproducing apparatus accommodated in said chamber, said apparatus comprising a rotary disk, a rewindable spring for rotating the disk, means for winding the spring including a flexible element which is stretched when the spring is held against unwinding and which is slack when the spring unwinds to rotate the disk, a portion of said flexible element extending through said opening, a handgrip member secured to said flexible element and located externally of said chamber to serve as a manual rewinding means for said spring, a stylus overlapping said disk and movable between a starting position at a first distance and a second position at a second distance from the periphery of said disk, deformable retainer means normally biasing said stylus into engagement with said disk so that, when the spring unwinds to rotate the disk, the stylus is compelled to travel from said starting position to said second position, deforming means responsive to stretching of said flexible element for deforming said retainer means so that the stylus may be disengaged from said disk, means for automatically returning the stylus to said starting position when the stylus is disengaged from said disk, said winding means and said disk having a common shaft which is rotatably mounted in said supporting elements and said body portion constituting the sole housing for said sound reproducing apparatus.

13. A combination as set forth in claim 12, wherein said body portion comprises an apertured wall portion and wherein said sound reproducing apparatus further comprises a loudspeaker diaphragm having an open side inwardly adjacent to said wall portion.

References Cited by the Examiner

UNITED STATES PATENTS

| | | | |
|---|---|---|---|
| 2,548,237 | 4/1951 | Pearson. | |
| 2,635,882 | 4/1953 | Murray | 274—1 |
| 3,017,187 | 1/1962 | Ryan | 274—14 |
| 3,082,006 | 3/1963 | Ryan | 274—1 X |
| 3,165,320 | 1/1965 | Ryan | 274—1 X |
| 3,168,318 | 2/1965 | Lea | 274—23 X |

NORTON ANSHER, *Primary Examiner.*

EVON C. BLUNK, C. B. PRICE, *Examiners.*